United States Patent
Ishibashi et al.

(10) Patent No.: US 6,709,167 B2
(45) Date of Patent: Mar. 23, 2004

(54) COMPOSITE FERRULE OF CONNECTOR FOR OPTICAL FIBERS, AND METHOD OF MANUFACTURING THE SAME

(75) Inventors: Kousei Ishibashi, Tokyo (JP); Masahiro Shibata, Tokyo (JP); Minoru Nakamura, Tokyo (JP); Tomohiko Matsuda, Tokyo (JP)

(73) Assignee: Kyoueisenzai Kabushiki Gaisha, Tokyo (JP)

( * ) Notice: Subject to any disclaimer, the term of this patent is extended or adjusted under 35 U.S.C. 154(b) by 83 days.

(21) Appl. No.: 09/965,397

(22) Filed: Sep. 27, 2001

(65) Prior Publication Data

US 2002/0037140 A1 Mar. 28, 2002

(51) Int. Cl.⁷ .................................................. G02B 6/36
(52) U.S. Cl. .............................................................. 385/78
(58) Field of Search .............................. 385/78, 73, 84

(56) References Cited

U.S. PATENT DOCUMENTS

| | | | | |
|---|---|---|---|---|
| 4,867,525 A | * | 9/1989 | DiMarco et al. | 385/84 |
| 5,154,708 A | * | 10/1992 | Long et al. | 606/16 |
| 5,859,944 A | * | 1/1999 | Inoue et al. | 385/78 |
| 5,975,770 A | * | 11/1999 | Yanagi et al. | 385/78 |

* cited by examiner

Primary Examiner—Khiem Nguyen
(74) Attorney, Agent, or Firm—Kilpatrick Stockton LLP

(57) ABSTRACT

A composite ferrule 4 of a connector for optical fibers, which includes a ferrule base 1 and a flange portion 3. The ferrule base 1 includes: a cylindrical front member 1A made of a hard material, which has an optical fiber insert hole 1B at the center thereof; and a rear member 2A made by molding synthetic resin with a substantially same diameter as the front member 1A. The rear member 2A has a coated-optical fiber guide hole 2B at the center thereof, and is joined to an end of the front member 1A. The flange portion 3 is formed on an end of the ferrule base 1 with synthetic resin and has a coated-optical fiber guide hole 2B.

14 Claims, 4 Drawing Sheets

COMPOSITE FERRULE OF CONNECTOR FOR OPTICAL FIBERS, AND METHOD OF MANUFACTURING THE SAME

BACKGROUND OF THE INVENTION

The present invention relates to a structure of a new composite ferrule used in a connector for connecting optical fibers, a manufacturing method of the ferrule, and a connector for optical fibers using the ferrule.

The inventors examined composite ferrules described in gazettes of Japanese Patent Laid-Open Nos. 61(1986)-57912, 2000-111758, and 2000-147320.

First, the composite ferrule disclosed in Japanese Patent Laid-Open No. 61(1986)-57912 gazette is formed by entirely covering the outside of a hard material with synthetic resin, such as ceramic. Second, the composite ferrule disclosed in Japanese Patent Laid-Open No. 2000-111758 gazette has a constitution in which an approximate entirety of a ferrule base made of synthetic resin is covered with a metallic pipe. Third, in the composite ferrule disclosed in Japanese Patent Laid-Open No. 2000-147320 gazette, as shown in FIG. 1, a ferrule base 10 made of ceramic (zirconia) is provided at an end thereof with a flange portion 11 made of metal or synthetic resin.

A ferrule base of a connecter for optical fibers requires high dimensional accuracy in a small-diameter hole for seating an optical fiber, an outer diameter of a cylindrical portion, and the like. Therefore, the ferrule is constituted in the following manner. The ferrule base uses ceramic as a molding material, for example zirconia, and is produced by use of an extrusion molding method or an injection molding method. Furthermore, in order to improve the dimensional accuracy of the ferrule base, the outer circumferential surface of the molded ferrule base and an optical fiber insert hole are subjected to grinding. Subsequently, a flange portion made of metal, for example stainless, is attached to the end of the ferrule base.

Therefore, there has been a problem that a lot of time and labor are required to manufacture the abovementioned ferrule, the amount of production per time unit is thus limited, and a manufacturing cost thereof is hence increased.

SUMMARY OF THE INVENTION

The object of the present invention is to solve the above-mentioned problem, and particularly to provide a composite ferrule produced at a low cost, in which only a tip portion of a ferrule base is constituted of a hard material such as ceramic or the other hard material, and in which the other portion of the ferrule base and a flange portion are integrally molded with synthetic resin, as opposed to a conventional ferrule base, which has been constituted of ceramic over the whole length thereof. The object of the present invention is also to provide a method of manufacturing the ferrule and a connector for optical fibers using the same.

In order to achieve the foregoing objects, a first aspect of the present invention is a composite ferrule of a connector for optical fibers including a ferrule base and a flange portion. The ferrule base includes: a cylindrical front member made of a hard material having an optical fiber insert hole at the center thereof, and a rear member made by molding synthetic resin with a substantially same diameter as the front member. The rear member has a coated-optical fiber guide hole at the center thereof and is joined to an end of the front member. The flange portion is formed on an end of the ferrule base made of synthetic resin having a coated-optical fiber guide hole.

A small-diameter portion is further preferably formed on an end of the front member, and the rear member is joined to the front member so as to cover an outer circumferential surface of the small-diameter portion with a part of the rear member. Alternatively, the rear member is joined to the front member by a part thereof being molded in a cavity hole provided on an inner circumferential surface of the end of the front member.

Furthermore, a second aspect of the present invention is a method of manufacturing a composite ferrule of a connector for optical fibers, which includes a ferrule base and a flange portion, the ferrule base having a front member and a rear member. The method includes the steps of: fixing the front member in a state where a small-diameter portion of the front member is exposed, and the other portion of the front member is made airtight; airtightly sectioning a cavity portion for forming the rear member and the flange portion by surrounding the small-diameter portion, while airtightly engaging a tip of an insert pin with an inlet of an optical fiber insert hole provided in the front member; and integrally molding the rear member and the flange portion by injecting molten resin to fill the cavity portion.

In addition, a third aspect of the present invention is a method of manufacturing a composite ferrule of a connector for optical fibers, which includes a ferrule base and a flange portion, the ferrule base having a front member and a rear member. The method includes the steps of: airtightly fixing the outer circumferential surface of the front member; airtightly sectioning a cavity portion for forming the rear member and the flange portion, the cavity portion communicating with the rear end of the front member, while airtightly engaging a tip of an insert pin with an inlet of an optical fiber insert hole of the front member; and integrally molding the rear member and the flange portion by injecting molten resin to fill the cavity portion, while integrally molding a part of the tip portion of the rear member on the inner circumferential surface of a cavity hole of the front member.

DETAILED DESCRIPTION OF THE PREFERRED EMBODIMENTS

Figure 1:
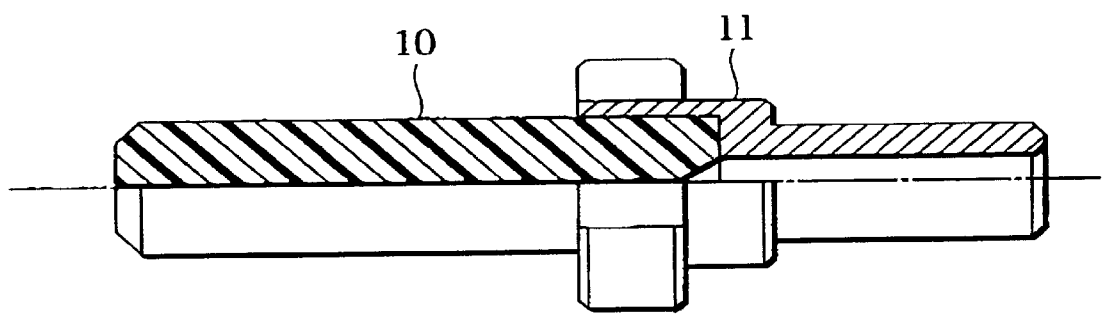
FIG. 1 is a front view partly in section showing a conventional composite ferrule.
Figure 2A:
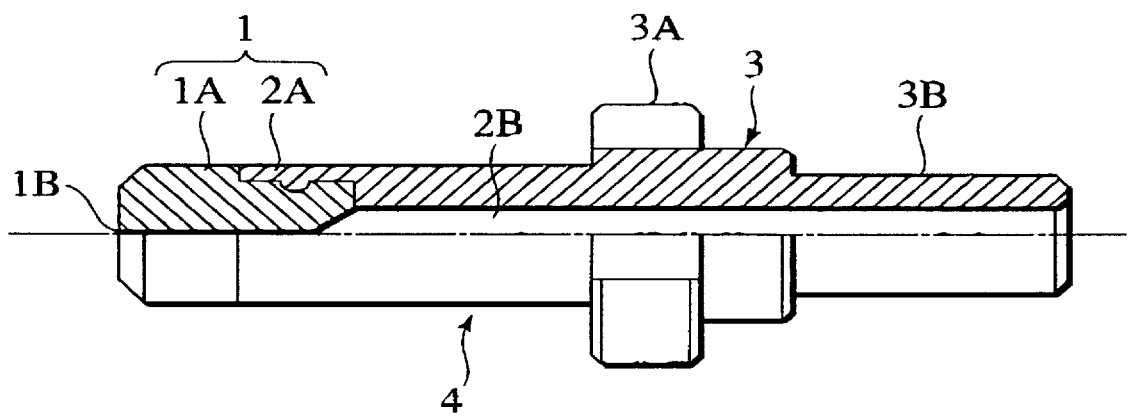
FIG. 2A is a front view partly in section showing a composite ferrule of a first embodiment according to the present invention.
Figure 2B:
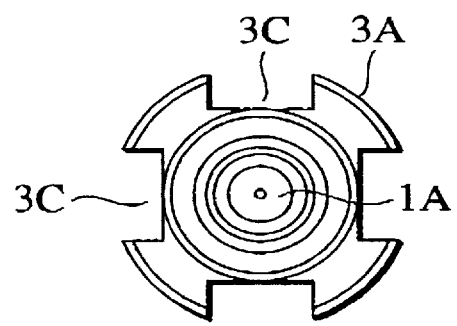
FIG. 2B is a side view of FIG. 2A.
Figure 3:
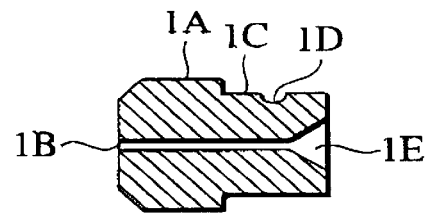
FIG. 3 is a sectional view showing an example of a front member of the composite ferrule of the first embodiment.

With reference to FIGS. 2A and 2B, and FIG. 3, description will be made on an example of a composite ferrule of a connecter for optical fibers according to the present invention.

A ferrule base 1 of a composite ferrule 4 of a first embodiment according to the present invention is constituted by integrally jointing a cylindrical front member 1A to a rear member 2A at an end of the front member 1A. The front member 1A includes an optical fiber insert hole 1B bored at the center thereof. The rear member 2A is made of synthetic resin (for example, PPS resin, PBT resin, and liquid crystal polymer, as well as polycarbonate, polyamide, polyimide, and the like). The front member 1A is constituted of a hard material member (for example, a metal alloy mainly composed of zirconia, titan, or stainless, silicon, amorphous silicon, and the like) having high dimensional accuracy secured by high-precision processing. At the other end of the rear member 2A, a flange portion 3 made of the same material as the rear member 2A is integrally molded.

The flange portion 3 includes a flange 3A formed at the rear end of the ferrule base 1 and a protruding portion 3B protruding from the flange 3A.

The flange of the first embodiment has grooves 3A at four locations. However, the flange may have two grooves or no such grooves.

A joining state of the front member 1A and the rear member 2A is as follows. At the end of the front member 1A, formed is a small-diameter portion 1C having a diameter smaller than an outer diameter of the front member 1A. The rear member 2A is joined to the front member 1A so that the small-diameter portion 1C is covered by a part of the rear member 2A and that the outer diameter of the rear member 2A as a whole is equal to or smaller than that of the front member 1A. The rear member 2A is thus further securely attached to the front member 1A.

Note that, when a hollow portion 1D directing in a radial direction is provided on a part of the small-diameter portion 1C, resin for the rear member 2A is flown into the hollow portion 1D, whereby the rear member 2A can be further securely joined to the front member 1A.

On the other hand, when the resin to form the rear member 2A can be sufficiently joined to the front member 1A directly or indirectly by interposing an adhesive layer, the small-diameter portion 1C can be omitted.

Taking compatibility with publicly known SC connectors, MU connectors, and LC connectors into consideration, the outer diameter of the front member 1A is desirably 1.25 mm or 2.5 mm. Moreover, when a ratio L/D, which is a ratio of a length L to an outer diameter D of the front member 1A, is in a range from 1.5 to 2.5, the ferrule can fully function as a ferrule of this kind of connecter.

In the first embodiment, the flange portion 3 is integrally molded with the rear member 2A by use of the same resin. However, as for the flange 3A of the flange portion 3, only a spring is disposed on the outer circumferential surface thereof, and high dimensional accuracy is not necessarily required for functioning. Therefore, the flange portion 3 may not be integrally molded with the rear member 2A by using the same resin, but may be integrally molded with the rear member 2A by use of different resin separately, or the flange portion 3 may be fitted to the ferrule base 1 separately.

Figure 4A:
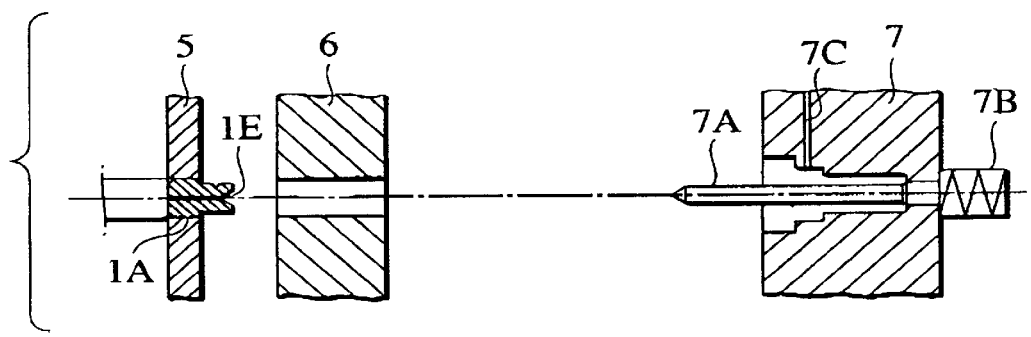
FIG. 4A is an explanation view showing a first step of a manufacturing method according to the present invention.
Figure 4B:
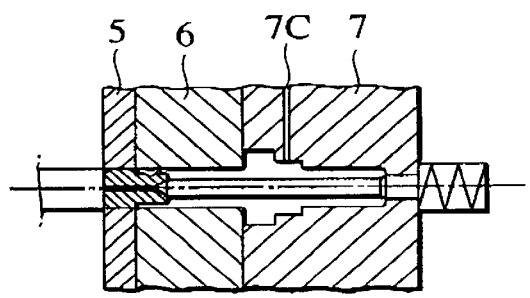
FIG. 4B is an explanation view showing a second step of the manufacturing method.
Figure 4C:
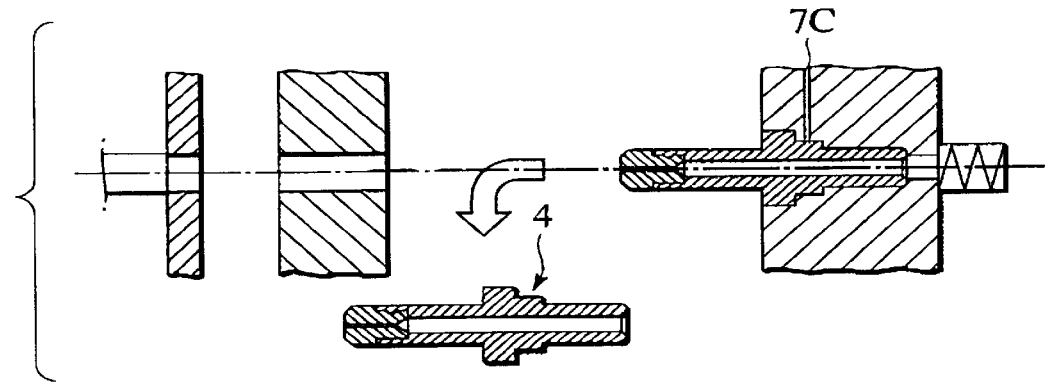
FIG. 4C is an explanation view showing a third step of the manufacturing method.

With reference to FIGS. 4A to 4C, description will next be made on an example of a method of manufacturing the ferrule 4.

A front member fixer 5, a ferrule base mold 6, and a flange portion mold 7 are coaxially arranged in series. The front member fixer 5 airtightly fixes a portion other than the small-diameter portion 1C of the front member, while the small-diameter portion 1C is exposed. The ferrule base mold 6 is movable so as to relatively approach or detach from the front member fixer 5 (FIG. 4A).

Furthermore, at the center of the flange portion mold 7, an insert pin 7A having a sharp tip is airtightly attached as a core through a spring 7B so as to freely move from the rear end of the mold flange portion 7 to the front member fixer 5 and so as not to allow molten resin to leak. Moreover, a submarine gate 7C for injecting the molten resin for filling connects the outer side surface of the mold 7 and an inner flange portion molding cavity.

The tip member fixer 5, the movable ferrule base mold 6, and the flange portion mold 7 are airtightly contacted with each other to be fixed coaxially in series. Moreover, the tip of the insert pin 7A is made to airtightly engage with a conical inlet 1E of an optical fiber insert hole of the front member 1A. Sequentially, molten resin is injected for filling from the submarine gate 7C, whereby to produce the ferrule in which the ferrule base 1 and the flange portion 3 are integrally molded so as to connect with the front member 1A (FIG. 4B).

Thereafter, after cooling the ferrule to be cured for a certain period of time, the tip member fixer 5, the molds 6 and 77 and the insert pin 7A are removed from the molded product (ferrule), thus obtaining the composite ferrule of the present invention (FIG. 4C).

Figure 5A:
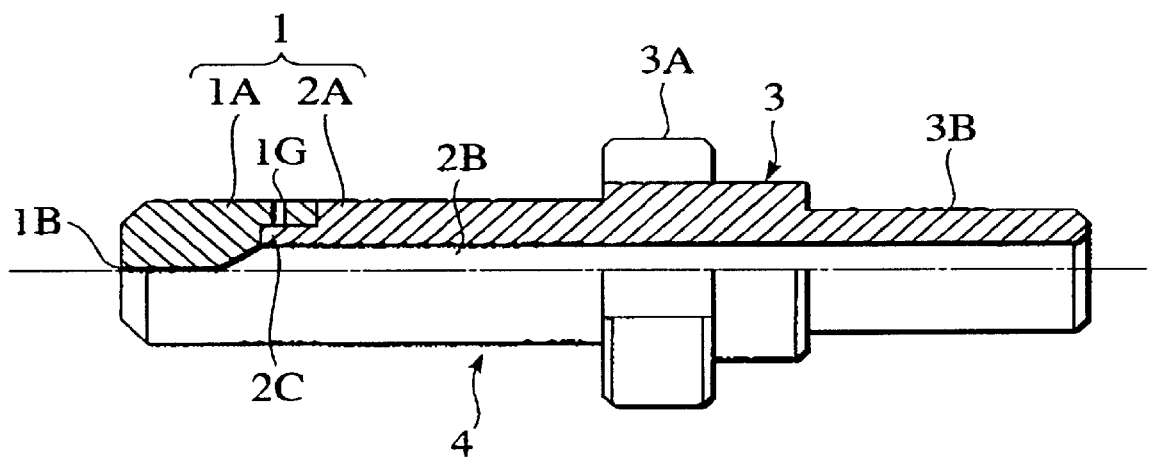
FIG. 5A is a front view partly in section showing a composite ferrule of a second embodiment according to the present invention.
Figure 5B:
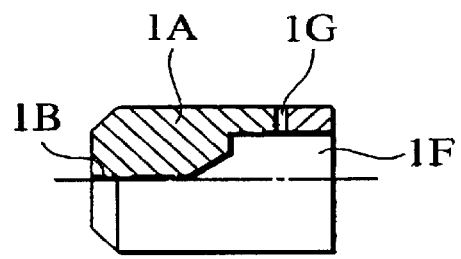
FIG. 5B is a front view partly in section showing a front member of the composite ferrule of the second embodiment.

FIGS. 5A and 5B show a composite ferrule 4 of a second embodiment according to the present invention. The composite ferrule of the second embodiment differs from that of the first embodiment in shape of the front member 1A. In other words, an outer circumferential surface of the front member 1A is shaped in a manner that the outer circumferential surface of the rear member 2A is extended as it is, and the outer circumferential surfaces of the front member 1A and the rear member 2A form a smooth curved surface. In the rear end surface of the front member 1A, a cavity hole 1F is provided by cutting from the tail portion toward the head portion of the front member 1A so as to communicate with the optical fiber insert hole 1B provided at the center of the front member 1A. The cavity hole 1F has a diameter larger than the outer diameter of the insert pin 7A, which is attached to be used when molding the rear member 2A. At least one hollow portion 1G is formed on the inner circumferential surface of the cavity hole 1F.

When the rear member 2A is molded as described below, a portion 2C of the tip of the rear member 2A is flown into the hollow portion 1G, so that the hollow portion 1G exert an operational effect of preventing the rear member 2A from rotating and/or disengaging with respect to the front member 1A.

As for a shape of the hollow portion 1G, at least one penetrating hole or concave portion extending in a radial direction of the front member 1A may be provided by cutting. Alternatively, a groove extending in an axial direction of the ferrule may be provided by cutting in a spline state on the inner circumferential surface of the cavity hole 1F.

Here, description will be made on a method of manufacturing the composite ferrule by use of the front member 1A of the second embodiment.

After the outer circumferential surface of the front member 1A is airtightly fixed, a cavity portion is airtightly sectioned, into which the resin for forming the rear member 2A and the flange portion 3 is to be flown, so as to communicate with the rear end of the front member 1A. At the same time, the tip of the insert pin 7A is made to airtightly engage with the inlet of the optical fiber insert hole 1B of the front member 1A. Sequentially, molten resin is injected to fill the cavity portion to integrally mold the rear member 2A and the flange portion 3, while the molten resin is injected to fill a gap between the cavity hole 1F of the front member 1A and the insert pin 7A.

In this way, a portion 2C of the tip of the rear member 2A is integrally molded on the inner circumferential surface of the cavity hole 1F.

Therefore, the portion 2C of the tip of the rear member 2A, which is molded on the inner circumferential surface of the cavity hole 1F, functions as a reinforcement member of the front member 1A. As the result, comparing to the length of the front member 1A of the first embodiment, the length of the front member 1A of the second embodiment can be made shorter.

Accordingly, the optical fiber insert hole 1B of the front member 1A of the second embodiment is made shorter than that of the first embodiment, so that the length of the optical fiber stripped can be made shorter. In addition, the front member 1A according to the second embodiment is advantageous in the case of being molded by a dry molding method (press molding) in place of an injection molding method, because the length thereof can be made short.

The composite ferrule produced in such a manner is fit into a plug case and/or a connector housing, thus obtaining a new connecter for an optical fiber connection.

In the composite ferrule according to the present invention, since only a part of the whole length of the ferrule base is constituted of a hard material member, namely, a precision grinded member such as zirconia, a precision finish grinding of the outer circumferential surface is required only in this part, thus shortening processing time. Furthermore, since special materials for precision grinding, such as zirconia, are not required for the ferrule base over the whole length, the cost thereof can be reduced.

Furthermore, since the length of the optical fiber insert hole is made shorter, the stripped length of the optical fiber obtained by removing the coating of the coated-optical fiber can be set shorter. Therefore, the insertion of the optical fiber can be made easy, and reliability thereof is improved. Still furthermore, since the flange portion and the ferrule base can be integrally molded, the manufacturing cost can be drastically reduced.

Although the invention has been described above by reference to certain embodiments of the invention, the invention is not limited to the embodiments described above. Modifications and variations of the embodiments described above will occur to these skilled in the art, in light of the teachings. The scope of the invention is defined with reference to the following claims.

What is claimed is:

1. A composite ferrule of an optical fiber connector, comprising:
    a ferrule base including: a front member made of a hard material, and having an optical fiber insert hole at the center thereof; and a rear member made of synthetic resin, and having a substantially same outer diameter as said front member, and having a coated-optical fiber guide hole at the center thereof, and being joined to a rear end portion of said front member; and
    a flange portion made of synthetic resin, and protruded from a rear end of said rear member, and having a coated-optical fiber guide hole at the center thereof.

2. The composite ferrule according to claim 1,
    wherein said rear member and the flange portion are integrally formed by simultaneous injection molding with synthetic resin of a same material.

3. The composite ferrule according to claim 1,
    wherein said rear end portion of said front member further comprises a small-diameter portion having an outer diameter smaller than that of said front member, and
    wherein said front member and said rear member are joined with each other by covering an outer circumferential surface of said small-diameter portion with a front end portion of said rear member.

4. The composite ferrule according to claim 1,
    wherein an outer circumferential surface of said front member is shaped as an outer circumferential surface of said rear member is extended, and
    wherein said rear end portion of said front member further comprises a cavity hole with a diameter larger than an outer diameter of an insert pin used in molding at the center thereof, and is communicated with said optical fiber insert hole of said front member, and
    wherein a part of a front end portion of said rear member is formed by being integrally molded on an inner circumferential surface of said cavity hole.

5. The composite ferrule according to claim 4,
    wherein the inner circumferential surface of said cavity hole further comprises at least one hollow portion, which receives the part of said front end portion of said rear member.

6. The composite ferrule according to claim 1,
    wherein the hard material constituting said front member is one of zirconia, silicon, and amorphous silicon.

7. The composite ferrule according to claim 1,
    wherein the hard material constituting said front member is metal mainly composed of one of titan and stainless.

8. The composite ferrule according to claim 1,
    wherein the outer diameter of said front member is one of 1.25 mm and 2.5 mm.

9. The composite ferrule according to claim 1,
    wherein a ratio L/D of a length L to an outer diameter D of said front member is in a range of 1.5 to 2.5.

10. A manufacturing method of a composite ferrule of an optical fiber connector, which is comprised of a ferrule base having a front member and a rear member, and a flange portion, the method comprising the steps of:
    fixing said front member in a state where a small-diameter portion of said front member is exposed and the outer portion of said front member is made airtight;
    airtightly sectioning a cavity portion for forming said rear member and said flange portion by surrounding the small-diameter portion, and airtightly engaging a tip of an insert pin with an inlet of an optical fiber insert hole provided in said front member; and
    integrally molding said rear member and said flange portion by injecting molten resin to fill said cavity portion, while engaging a part of said front end portion of said rear member with at least one hollow portion of the small-diameter portion of said front member.

11. A manufacturing method of a composite ferrule of an optical fiber connector, which is comprised of a ferrule base having a front member and a rear member, and a flange portion, the method comprising the steps of:
    airtightly fixing an outer circumferential surface of said front member;
    airtightly sectioning a cavity portion for forming said rear member and said flange portion, the cavity portion communicating with said rear end portion of said front member, and airtightly engaging a tip of an insert pin with an inlet of an optical fiber insert hole of said front member; and
    integrally molding said rear member and said flange portion by injecting molten resin to fill said cavity portion, while engaging a part of said front end portion of said rear member with at least one hollow portion on an inner circumferential surface of a cavity hole of said front member.

12. The composite ferrule according to claim 3, wherein said small-diameter portion further comprises at least one hollow portion, which receives a part of the front end portion of said rear member.

13. A composite ferrule of an optical fiber connector, comprising:
- a ferrule base including: a cylindrical front member made of a hard material, and having an optical fiber insert hole at the center thereof; and a rear member made of molding synthetic resin, and having a substantially same outer diameter as said front member, and having a coated-optical fiber guide hole at the center thereof, and being joined to an end of said front member; and
- a flange portion formed on an rear end of said ferrule base with synthetic resin, and having a coated-optical fiber guide hole, and wherein
  - an outer circumferential surface of said front member is shaped as an outer circumferential surface of said rear member is extended,
  - a cavity hole with a diameter larger than an outer diameter of an insert pin used in molding is provided from the rear end toward the tip end of the front member, and is communicated with an optical fiber insert hole provided from the tip end toward the rear end in the center of said front member, and
  - a part of a tip member of the rear member is formed by being integrally molded on an inner circumferential surface of the cavity hole.

14. The composite ferrule according to claim 13, wherein the inner circumferential surface of said cavity hole further comprises at least one hollow portion, which receives a part of the tip member of said rear member.

* * * * *